(12) United States Patent
Alfarano et al.

(10) Patent No.: US 9,083,867 B2
(45) Date of Patent: Jul. 14, 2015

(54) DEVICE FOR ASSIGNING A GEOGRAPHICAL POSITION TO A PICTURE

(71) Applicant: STMICROELECTRONICS S.R.L., Agrate Brianza (IT)

(72) Inventors: Marco Alfarano, Pozzuoli (IT); Francesco Varone, Bellona (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 0 days.

(21) Appl. No.: 13/869,259

(22) Filed: Apr. 24, 2013

(65) Prior Publication Data

US 2013/0286248 A1    Oct. 31, 2013

(30) Foreign Application Priority Data

Apr. 27, 2012    (IT) .............. MI2012A0708

(51) Int. Cl.
*H04N 5/76* (2006.01)
*H04N 5/225* (2006.01)
*H04L 9/32* (2006.01)
*G01S 19/14* (2010.01)
*H04N 1/32* (2006.01)
*G01S 19/13* (2010.01)
*H04N 101/00* (2006.01)

(52) U.S. Cl.
CPC .............. *H04N 5/2252* (2013.01); *G01S 19/14* (2013.01); *H04L 9/3247* (2013.01); *H04N 1/32128* (2013.01); *G01S 19/13* (2013.01); *H04N 2101/00* (2013.01); *H04N 2201/0084* (2013.01); *H04N 2201/3214* (2013.01); *H04N 2201/3253* (2013.01); *H04N 2201/3274* (2013.01); *H04N 2201/3281* (2013.01)

(58) Field of Classification Search
CPC ....... G01S 19/13; G01S 19/14; H04L 9/3247; H04N 1/32128; H04N 2101/00; H04N 2201/0084; H04N 2201/3214; H04N 2201/3253; H04N 2201/3274; H04N 2201/3281; H04N 5/2252
USPC ........................................ 348/231.3; 713/171
See application file for complete search history.

(56) References Cited

U.S. PATENT DOCUMENTS

| | | |
|---|---|---|
| 2003/0204736 A1 | 10/2003 | Garrison et al. |
| 2004/0162981 A1 | 8/2004 | Wong |
| 2004/0201751 A1* | 10/2004 | Bell et al. ................ 348/231.99 |
| 2006/0114338 A1 | 6/2006 | Rothschild |
| 2008/0089554 A1 | 4/2008 | Tabankin et al. |
| 2008/0184272 A1 | 7/2008 | Brownewell |
| 2011/0093712 A1* | 4/2011 | Jin et al. ........................ 713/171 |

FOREIGN PATENT DOCUMENTS

| | | |
|---|---|---|
| CN | 102164345 A | 8/2011 |
| EP | 1758366 A1 | 2/2007 |

* cited by examiner

*Primary Examiner* — Trung Diep
(74) *Attorney, Agent, or Firm* — Allen, Dyer, Doppelt, Milbrath & Gilchrist, P.A.

(57) ABSTRACT

A device for assigning a geographical position to a picture may include a photo camera module for taking the picture, a satellite positioning system receiver module for identifying geographical coordinates when the picture is taken, and a cryptographic module to sign the picture and the corresponding geographical coordinates. The device may store the signed picture and the corresponding geographical coordinates as certified geographical position of the picture.

23 Claims, 1 Drawing Sheet

DEVICE FOR ASSIGNING A GEOGRAPHICAL POSITION TO A PICTURE

FIELD OF DISCLOSURE

The present disclosure relates to a device and related method for assigning a geographical position to a picture.

BACKGROUND

A method for assigning a geographical position to a picture is disclosed in Chinese Patent Doc. No. CN20111099180. This patent application discloses recording positional information in a picture taken by a mobile phone. The method includes the steps of starting a Global Positioning System (GPS) module of the mobile phone to obtain the positional information, saving the positional information into a memory of the mobile phone, and stopping the GPS module. When the mobile phone takes the picture, the positional information may be recalled from the memory and recorded into the picture, saving them together. In another embodiment, a picture or a picture folder in the mobile phone is browsed and a function for writing positional information may be recalled, to write the positional information into a selected picture. Also in this case, the selected picture is saved with the positional information.

More particularly, the GPS mobile phone of Chinese Patent Doc. No. CN102164345 runs the GPS module for a short time. The GPS module is not started after the picture is taken for energy conservation purposes. The positional information is written into the picture when the picture is viewed afterwards, even if the positional information is not recorded in the picture, when it is taken.

This method may have some drawbacks. First of all, the positional information acquired in a certain geographical location may be assigned to a picture which is taken in a different geographical location. Thus, the picture may be deprived of any documental value, since the positional information saved with it does not guarantee that the picture has been really taken in the geographical location indicated by the positional information.

Moreover, it may not be possible to determine the device used to take the picture from the picture and the positional information saved. This is a limitation which may further weaken the documental value of the picture. Besides, it may be difficult to identify the user taking the picture at the geographical location or to associate a date/time to the picture for proving that the device and/or the user were in a certain geographical location at a certain date/time, when the picture was taken.

Above all, there may be no way to avoid a combination of such information, for example, saving a picture in association with a date/time different from the date/time when the picture was taken or with user and/or device identification information not corresponding to an identity of the user or device really used for taking the picture.

Finally, the typical method may be limited in the precision of the positional information returned by the GPS module, especially if such module receives a weak signal, for example, due to shielded fields, delayed paths, reflections from buildings, ceilings, tunnels, etc. Of course, assigning a wrong positional information to the picture may further weaken its documental value.

Another approach for assigning a geographical position may provide that a GPS module is always active in a device, which further includes a camera for taking a picture. Substantially, this method may suffer from all the disadvantages discussed above and also from the high power consumption of the GPS module, which is always active, even when it is not necessary to retrieve a geographical position to be associated to the picture.

SUMMARY

An object is to provide a method for associating accurate positional information to a picture taken in a geographical position, thus giving a sure documental value of the data returned, preferably or optionally completing the returned data with information on the device and/or user which have taken the picture. Also, another object may be to improve the precision of the positional information, thus providing reliable data.

A device may include camera (means) for taking a picture, and a GPS module (means) for identifying a geographical position when the picture is taken. The picture may be saved only with the geographical coordinates of the position after being signed or encrypted with such geographical coordinates. A cryptographic key for signing the picture and the corresponding geographical coordinates may be stored in the device and may not be accessible, thus avoiding a signature of the picture taken with other geographical coordinates or a same signature of the geographical coordinates with a picture taken in a different location. The picture and the corresponding geographical coordinates may be returned as signed aggregated data and may be completed with further information associated to a date/time when the picture has been taken and more optionally with information associated to the user. Also this information may be signed with the cryptographic key of the device. Additionally, the signed and aggregated data returned by the device may have a high documental value since they can be used to prove that the picture has been taken is a predetermined location and at a precise date and time, and that it has been taken by a specific device and/or a user.

Another aspect is directed to a device for assigning a geographical position to a picture. The device may comprise a photo camera module for taking the picture, a positioning system signal receiver module for identifying geographical coordinates when the picture is taken, and a cryptographic module to sign the picture and the corresponding geographical coordinates. The device may store the signed picture and the corresponding geographical coordinates as certified geographical position of the picture. In some embodiments, the device may include a cryptographic key, which is secret and not accessible outside the device, for signing the picture and the geographical coordinates as aggregated data. For example, the positioning system signal receiver may comprise a GPS module.

Moreover, the photo camera module, the positioning system signal receiver module, and the cryptographic module may be embedded in one single chip, i.e. a microchip, including the cryptographic key for signing the picture and the corresponding geographical coordinates. In this respect, the modules may work internally for saving the identified geographical location together with the picture taken and to sign the corresponding aggregated data. More particularly, the separate information, i.e. the picture alone or the geographical coordinates alone, or the aggregated data in clear may not be accessible, and only the signed aggregated data may be returned by the single chip. In one embodiment, the single chip may be included and integrated in a mobile phone or in a photo camera device. In another embodiment, the one single chip may comprise an integrated circuit (IC) card, a smart card or a subscriber identity module (SIM) card. The term chip and microchip may be used as alternatives and indicate an IC including its own memory and microprocessor.

In another embodiment, one of the photo camera module, the positioning system signal receiver module, and the cryptographic module may be embedded in a first chip, and the other modules are embedded in at least one second chip, the first chip and the at least one second chip including, respectively, a first cryptographic key and a second cryptographic key. Each module may be programmed to authenticate another module and to transmit encrypted data to such another module through the first cryptographic key and the second cryptographic key.

More particularly, each module is programmed to perform mutual authentication with at least one of the other modules and/or to transmit encrypted data to such at least one of the other modules. In some embodiments, a digital signature or digital signature mathematical scheme may be used for demonstrating the authenticity of data transmitted from one module to another module or from one chip to another chip including such modules. A valid digital signature may allow the recipient module or recipient chip to treat the received data as created by an expected sender module or sender chip and that the data was not altered in transit. Data may include the digital picture, the geographical location, and/or date/time, and or data associated to the user or to the device of the user.

In some embodiments, a public-key cryptographic algorithm may involve two separate keys is used. One key may be used to lock or encrypt the data and another key to unlock or decrypt the ciphered data. The two keys cannot be used both for encrypting and decrypting. For example, one key may be associated to a first module or chip is public, i.e. known to the other modules, and the other key of the first module may be private, i.e. not known to the other modules. The first module or chip may encrypt the data to be transmitted with its private key and the corresponding public key is used from the other modules for verifying a signature of data encrypted and to check that such data have been really transmitted from the first module. In an embodiment, since encrypting the entire data may be computationally expensive, a hash of the message may be encrypted for signature verification purposes. Thus, the use of the cryptographic algorithm may allow checking the authenticity of data by creating a digital signature of the private key, which can be verified using the public key.

For example, the photo camera module may be in a first chip, the positioning system signal receiver module may be in a second chip, and the cryptographic module may be in a third chip. Each chip may include a corresponding cryptographic key, which is not accessible outside the chip and communicates signed data to the other chips. The first chip may receive the geographical coordinates from the second chip, detect if such geographical coordinates are really transmitted by the second chip on the base of their encryption, aggregate the picture and the geographical coordinates received from the second chip, and sign the aggregated data for transmission to the cryptographic module. The aggregated data in clear, the picture alone, or the geographical coordinates alone may not be accessible inside the first chip. The third chip may be programmed to check whether the signed aggregated data is received from the first chip, on the base of their encryption, and may further sign aggregated data as processed or belonging to the device. In an embodiment, the third chip may be in a removable smart card or in a security element associated to a person identity.

In another embodiment, the device may include a package enclosing the first and the at least second chip. The package may comprise a rigid enveloping layer arranged to break the chips if opened. For example, the rigid enveloping layer may include a flat surface of resin, which is subject to rupture if bended. The chips may be arranged under the flat surface of the rigid enveloping layer in order to be broken if the flat surface cracks.

In another embodiment, each chip may include a light sensor or another environmental sensor(s) arranged to sense light or another environmental element(s) if the package is opened, and a module (means) is provided for irreversibly blocking the chips when light is detected. Of course, such sensors may be provided also on the single chip integrating all the modules.

Additionally, a chip may include more than one module comprising a circuit interconnecting the embedded modules and the interconnection circuit arranged to be broken or interrupted if one of the embedded module is moved, for example, extracted from the second chip. Also in this case, a module (means) may be provided for irreversibly blocking the chips, if the interconnection circuit is broken. In another embodiment, a module (means) may be provided for irreversibly blocking operations of the chips when security of an interconnecting circuit is compromised or an attack is detected.

In an embodiment, the device may further include a fingerprint detector for detecting a finger print of the user. The cryptographic module may further sign the fingerprint detected from the detector. The fingerprint detector may be coupled to a push button or the like, which must be touched for taking the picture. Advantageously, according to this aspect, also the identity of a user associated to the fingerprint may be associated to the picture. In some embodiments, the signed picture may be compressed. The fingerprint detector may be included in the single chip or in one of the chips embedded in the package.

Another aspect is directed to a method for assigning a geographical position to a picture. The method may include taking the picture with a photo camera module, identifying geographical coordinates with a positioning system signal receiver module, for example, a GPS module, when the picture is taken, signing the picture and the corresponding geographical coordinates with a cryptographic module, and storing the signed picture and the corresponding geographical coordinates as certified geographical position of the picture.

The cryptographic module may receive the geographical coordinates signed with a GPS cryptographic key of the GPS module and the picture signed with a CMOS cryptographic key of a CMOS of the photo camera module, and verify the signatures of the geographical coordinates and picture. The cryptographic module may aggregate the geographical coordinates and the picture, if the signatures are recognized, and encrypt the aggregated data with a cryptographic key. The encrypted aggregated data may be returned as a picture with a certified geographical position.

BRIEF DESCRIPTION OF THE DRAWINGS

Further advantages and features of the method and device according to the present disclosure will be apparent from the following description which is given with reference to the annexed drawings only for exemplificative and non limitative purpose.

DETAILED DESCRIPTION

Figure 1:
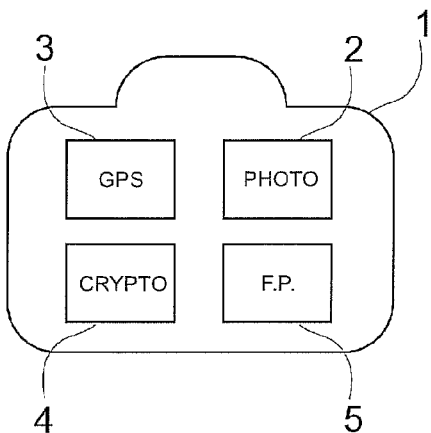
FIG. 1 is a schematic diagram of a device, according to the present disclosure.

With reference to FIG. 1, a device 1 for assigning a geographical position to a picture according to the present disclosure includes a functional photo camera module 2 for taking a picture, a functional positioning system signal receiver module 3 for identifying geographical coordinates, and a functional cryptographic module 4 to sign the picture and the corresponding geographical coordinates.

For example, the positioning system signal receiver module 3 may be compliant to Naystar GPS, GLONASS or the upcoming Galileo positioning system. The following description is given with reference to a functional GPS module for convenience of explanation only and a different functional positioning system signal receiver 3 for identifying geographical coordinates may be used.

In an embodiment of the present disclosure, the photo camera functional module 2 is implemented in hardware by a semiconductor technology including for instance a complementary metal-oxide semiconductor (CMOS) sensor for taking a picture in form of an analog signal and an A/D converter for converting the analog signal into a digital picture. The functional GPS module 3 is implemented in hardware with a GPS receiver including an antenna for receiving position and date/time from a GPS system connectable thereto; the functional GPS module 3 is active when the photo camera functional module is activated and communicates with the functional photo camera module to detect. The functional photo camera module 2 triggers the functional GPS module 3 when the picture is taken and date/time and position are detected at that time. More particularly, the positions are geographical coordinates of a geographical location in which the picture is taken. The functional cryptographic module 4 is associated to a cryptographic key and receives the picture in digital format from the photo camera module 2 and the position and date/time from the functional GPS module 3.

Different embodiments of the present disclosure provide that the photo camera module 2 sends the digital picture to the functional GPS module 3 and this last component transmits the position and date/time and the picture in digital format to the functional cryptographic module 4, or that the functional GPS module 3 sends the position and date/time to the photo camera module 2 and this last transmits the position and date/time and the picture in digital format to the functional cryptographic module 4. The functional cryptographic module 4 receives the position and date/time and the picture in digital format and signs or encrypts such data with the cryptographic key. According to the present embodiments, the digital picture and the position and date/time are aggregated in a single data file before signature, they are signed only at that time they are stored in memory. Thus, the picture or the position or the date/time are not accessible separately within the device before being signed.

Figure 2:
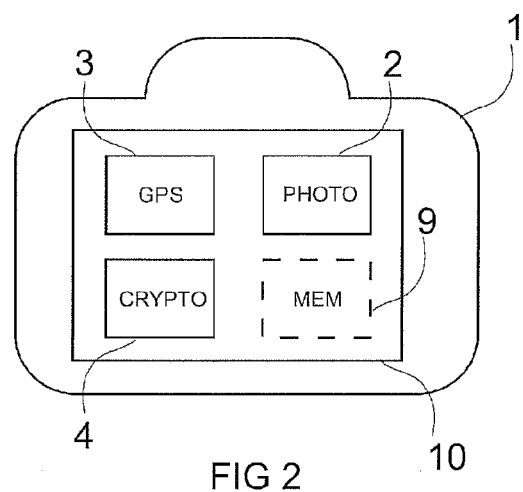
FIG. 2 is a schematic diagram of another embodiment of the device of FIG. 1.

In one embodiment, the functional photo camera module 2, the functional GPS module 3, and the functional cryptographic module 4 are integrated in one single microchip 10 including a memory 9, and the signed picture and signed position and date/time are temporarily stored in aggregated form. In one embodiment, the memory is a non-erasable memory. Advantageously, the functional photo camera module 2, the functional GPS module 3, the functional cryptographic module 4, and the memory 9, according to this embodiment, are structurally embedded in one single chip 10, as represented in FIG. 2. Wherefrom, the digital picture in clear or the position and date/time in clear or the aggregated data of such picture and position and date/time in clear cannot be retrieved, but only the signed aggregated data is stored in the single chip 10 and may be read from its memory. In an embodiment, the single chip is embedded in a mobile device, for example, a mobile phone or a photo camera device. In another embodiment, the single chip is embedded in an IC Card for a mobile device, for example, a mobile phone or a photo camera device.

Figure 3:
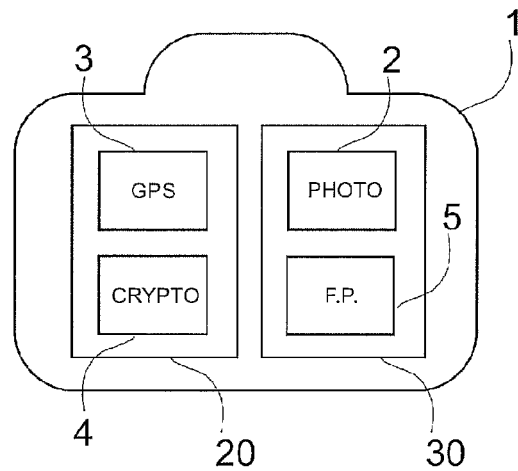
FIG. 3 is a schematic diagram of yet another embodiment of the device of FIG. 1.

In another embodiment, the functional photo camera module 2, the functional GPS module 3, and the functional cryptographic module 4 are structurally associated to two or more chips 20, 30, for example, the functional photo camera module 2 and the functional GPS module 3 are in a first microchip 20 and the functional cryptographic module 4 is in a second microchip 30, as represented in FIG. 3, or the functional photo camera module 2 is in a first microchip and the functional GPS module 3 and the functional cryptographic module 4 are in a second microchip. These combinations of functional modules are given only for explanation and do not limit the scope of the embodiments and further possible combinations.

Also according to this embodiment, the first 20 and second microchip 30 are structurally connected and programmed to avoid a detection of the digital picture in clear or the position and date/time in clear or the aggregated data of such picture and position and date/time. In this respect, in an embodiment of the present disclosure, each microchip 20, 30 includes a cryptographic key and signs the data processed or detected by the corresponding functional modules. For example, if the first microchip 20 includes the functional photo camera module 2 as well as the functional GPS module 3, the digital picture taken by the functional photo camera module 2 and the geographical coordinates and date/time taken by the functional GPS module 3 are signed and transmitted to the functional cryptographic module 4 stored in the second microchip 30. The signed picture and the geographical coordinates and date/time may be decrypted only within the functional cryptographic module 4, which aggregates them in aggregated data and then signs the aggregated data. Only the signed aggregated data is stored in the memory of the second microchip 30.

According to this embodiment, all the microchips are structurally embedded in a package 40. The package 40 is embedded in a mobile device, for example, in a mobile phone or photo camera device or in an IC card for the mobile phone or photo camera device. The package is structurally manufactured to damage the microchips therein embedded, if opened, in order to avoid inspection of each separate microchip, for example, an inspection intended to detect the cryptographic keys used to sign the picture, the geographical coordinates or the corresponding data. In one embodiment, the package includes a flat surface or cover under which the microchips are arranged. The flat surface is highly resistant to bending due to a rigid material therein, for example, an inflexible resin, and is broken only if a highly bending force, over a predetermined threshold is applied. If such a high bending force is applied, not only will the flat surface be broken, but also the underlying microchips 20, 30, which are preferably manufactured with a material less resistant to bending than the resin. Thus, if the package is opened, the microchips are broken and cannot be inspected nor remanufactured (e.g by rearranging microchip interconnections or replacing one microchip among others). A person skilled in the art may appreciate that a different implementation of the chip support may be used and that even two different packages may be provided, one for each chip 20 or 30.

In another embodiment, further means or a circuit module are provided to protect the cryptographic keys in the microchips and to avoid the microchip extraction from the package. More particularly, the circuit module is provided inside the package to detect light if the package is opened. In another aspect, an interconnection circuit of the microchips inside the package is provided, where the interconnections circuit is preferably also associated to a package structure. If the package structure is opened, for example, if it is cut, the interconnections circuit is cut or interrupted with the package structure. In all these embodiments described above, means or a module are provided to damage the microchips, rendering them unusable and/or the memory content unreadable, if an aperture of the package is detected, such module, for example providing an electrical erasure of the memory content.

In another embodiment, a fingerprint detector 5 is embedded as an additional functional module; as explained above, such additional functional module may be structurally associated to a same microchip 10 including all the other functional modules or in a microchip 30 that is embedded in the package with one or more other microchips 20 implementing the other functional modules. Some details of possible implementation of the fingerprint functional module 5 are omitted since substantially corresponding to what previously described for the other modules. For example, the detected fingerprint may be signed in the microchip 30 including the fingerprint detector 5 before being transmitted to the functional cryptographic module 4, to be aggregated with other data, to avoid that the detected finger print is read or intercepted to be associated to a picture or to geographical coordinates not really associate to the person taking the picture.

The fingerprint detector 5 includes a sensitive surface arranged to be touched when the microchip or the package is inserted in a device for taking the picture, for example, in the mobile device or in the photo camera module. According to this embodiment, the fingerprint of the user are detected and aggregated to other data, i.e. the digital picture, the geographical coordinates, the date/time, and signed by the cryptographic module. The resulting aggregated data guarantees that the picture has been taken by the person identified by the respective finger prints and that such picture has been taken in the geographical position indicated by the coordinates, at a specified the date/time.

In an embodiment, information concerning the single microchip 10 or package 40 and/or information of the mobile device including such single microchip or package and through which the picture has been taken, are stored as aggregated data with the picture, the geographical coordinate, the date/time and/or the finger print. Such information includes a unique serial number of the single microchip or package and/or information of the mobile device, for example the corresponding International Mobile Station Equipment Identify (IMEI).

In one embodiment, the digital signature is not applied to the picture taken but on a reduced version of such picture, thus simplifying the corresponding verification. In fact, a high resolution, for example, 15 million pixels or more, and a high color depth, i.e. 36 bits per pixel or more, would result in a picture size of tens of megabytes in the raw mode and applying the digital signature on a picture of this size, as well as verifying such signature, is too complicated and computationally intensive. Moreover, if just a single pixel contains an error, the signature might fail, even if the picture has not been manipulated or the signature has been executed with the correct functional module. Thus, optionally, the digital signature is processed or calculated on a picture with lower resolution, preferably having a reduced color depth, for example, in black and white, more preferably cropped to remove the parts closest to be borders, in a lossly or losslessly compressed version. The picture with lower resolution is considered a digital signature reference image of the picture taken. Advantageously, the quality of such reference image is sufficient to visually verify the correspondence with the picture taken. For example, according to the present embodiments, if a car-plate number is taken as a picture, the number of the car plate is intelligible also on the digital signature reference image having lower resolution than the picture taken. Thus, the security of the system is not compromised.

In an embodiment, the method provides a function to activate or deactivate the processing of the digital signature on the picture with lower resolution. When really small objects or details of an object or an object placed far from the camera module is taken, the processing of the digital signature with high resolution may be activated.

In an embodiment, the digital picture and the reference image can be retrieved separately, and the geographic position information, date/time and digital signature could be applied to the reference image only. The technical issue described above may have an approach comprising a method for assigning a geographical position to a picture. The method comprises taking the picture with a photo camera module, identifying geographical coordinates with a GPS module, when the picture is taken, signing the picture and the corresponding geographical coordinates with a cryptographic module, and storing the signed picture and the corresponding geographical coordinates as certified geographical position of the picture.

For example, the cryptographic module receives the geographical coordinates signed with a GPS cryptographic key of the GPS module and the picture signed with a CMOS cryptographic key of a CMOS of the photo camera module, verifies the signatures of the geographical coordinates and picture, aggregates the geographical coordinates and the picture if the signature is recognized, and encrypts the aggregated data with a cryptographic key, returning the encrypted aggregated data as certified geographical position of the picture.

The method further provides phases to improve a precision of the coordinates of the geographical location where the picture is taken. A GPS positioning accuracy increases proportionally to the time passed from the switch on of the GPS receiver. After switching on, the GPS receiver stores a history of coordinates which is used to track a movement of the microchip. An algorithm takes in input the history of coordinates a, b, c, d, e received from the GPS with the corresponding date/times a', b', c', d', e' and processes an estimated position F at a corresponding estimated date/time F', which is compared to a detected position f' really received at a detected time f'. The algorithm includes interpolating techniques to process the estimated position F and date/time F'. According to this method, the estimated position F and date/time F' may be used to improve precision of the detected position f and date/time f', if the signal is weak or in its place if the position f and date/time f' cannot be detected due to an availability of the signal.

In another embodiment, the GPS receiver detects the reliability of positional information and the picture is associated to the positional information only if these last are reliable. For example, the positional information are considered unreliable if the satellite signal is weak, i.e. under a predetermined threshold, or because the receiver activation is too limited in time, for example, below a predetermined number of seconds. Thus, the positional information associated to the picture has a high degree of accuracy.

In another embodiment, the positional information associated to the picture also includes an index indicating the accuracy of the computed positional information. In another aspect, the date/time is detected by a further radio receiver module that receives and decodes terrestrial time signals, such as the DCF77 long wave radio station.

Advantageously, a picture taken with the method and device according to the present disclosure has a high documental value since it can be used to prove that the picture has been really taken in a geographical position associated to the geographical coordinates stored with the picture and/or at the date/time and/or from a person identified by the fingerprint and/or through a specified hardware device corresponding to a serial number stored with such picture as aggregated data. For example, in a car accident, a witness or an official may take a picture of a damaged car that undeniably documents that the car accident occurred in a street corresponding to precise geographical coordinates and was taken by the witness or an official at a precise time and date, with a specific mobile device. The device and method may be advantageously used for monitoring environment changes, for example, glaciers retreat or deforestation.

That which is claimed is:

1. A device for assigning a geographical position to a picture comprising:
   at least one integrated circuit (IC) chip comprising
      a photo camera module configured to take the picture,
      a positioning system module configured to identify geographical coordinates when the picture is taken,
      a cryptographic module configured to sign the picture and the geographical coordinates, and
      a memory configured to store the signed picture and the geographical coordinates as a certified geographical position of the picture; and
   a package configured to enclose said at least one IC chip, said package comprising a rigid enveloping layer configured to, if said package is opened, break said at least one IC chip.

2. The device according to claim 1 wherein said at least one IC chip comprises a single integrated circuit (IC) chip; and wherein said cryptographic module includes a cryptographic key configured to sign the picture and the geographical coordinates.

3. The device according to claim 1 wherein said at least one IC chip comprises a first IC chip, and at least one second IC chip;
   wherein at least one of said photo camera module, said positioning system module, and said cryptographic module is embedded in said first IC chip and the other modules are embedded in said at least one second IC chip; and wherein each module is configured to perform mutual authentication with the other modules and to transmit encrypted data to the other modules.

4. The device according to claim 3 wherein said rigid enveloping layer includes a flat surface configured to rupture if bent, said first and at least one second IC chips being under said flat surface and to be broken if said flat surface cracks.

5. The device according to claim 3 wherein each of said first and at least one second IC chips includes:
   a light sensor configured to sense light only if said package is opened; and
   a module configured to irreversibly block said first and at least one second IC chips when the light is detected.

6. The device according to claim 3 wherein said at least one second IC chip includes:
   an interconnection circuit configured to interconnect the embedded modules, said interconnection circuit configured to be broken if one of the embedded modules is extracted from said at least one second IC chip; and
   a module configured to irreversibly block operations of said first and at least one second IC chips when said interconnecting circuit is broken.

7. The device according to claim 3 wherein said at least one second IC chip includes:
   an interconnection circuit configured to interconnect the embedded modules; and
   a module configured to irreversibly block operations of said first and at least one second IC chips when a security feature of said interconnection circuit is compromised or an attack is detected.

8. The device according to claim 1 further comprising a fingerprint detector configured to generate a fingerprint; and wherein said cryptographic module is configured to sign the fingerprint.

9. The device according to claim 1 further comprising a module configured to compress the picture to be signed.

10. The device according to claim 1 further comprising a module configured to retrieve date/time when the picture is taken; wherein said cryptographic module signs the date/time; and wherein said photo camera module includes a complementary metal-oxide-semiconductor (CMOS) image sensor.

11. A circuit for an integrated circuit (IC) card, the circuit for assigning a geographical position to a picture and comprising:
    at least one integrated circuit (IC) chip comprising
       a photo camera module configured to take the picture,
       a positioning system module configured to identify geographical coordinates when the picture is taken,
       a cryptographic module configured to sign the picture and the geographical coordinates, and
       a memory configured to store the signed picture and the geographical coordinates as a certified geographical position of the picture; and
    a package configured to enclose said at least one IC chip, said package comprising a rigid enveloping layer configured to, if said package is opened, break said at least one IC chip.

12. The circuit according to claim 11 wherein said at least one IC chip comprises a single integrated circuit (IC) chip; and wherein said cryptographic module includes a cryptographic key configured to sign the picture and the geographical coordinates.

13. The circuit according to claim 11 wherein said at least one IC chip comprises a first IC chip, and at least one second IC chip; wherein at least one of said photo camera module, said positioning system module, and said cryptographic module is embedded in said first IC chip and the other modules are embedded in said at least one second IC chip; and wherein each module is configured to perform mutual authentication with the other modules and to transmit encrypted data to the other modules.

14. The circuit according to claim 13 wherein said rigid enveloping layer includes a flat surface configured to rupture if bent, said first and at least one second IC chips being under said flat surface and to be broken if said flat surface cracks.

15. The circuit according to claim 13 wherein each of said first and at least one second IC chips includes:
    a light sensor configured to sense light only if said package is opened; and
    a module configured to irreversibly block said first and at least one second IC chips when the light is detected.

16. The circuit according to claim 11 wherein said photo camera module comprises a mobile phone camera module.

17. A method for assigning a geographical position to a picture, the method comprising:
- using a photo camera module to take the picture;
- using a positioning system module to identify geographical coordinates when the picture is taken;
- using a cryptographic module to sign the picture and the geographical coordinates; and
- storing the signed picture and the geographical coordinates as a certified geographical position of the picture, at least one integrated circuit (IC) chip carrying the photo camera module, the positioning system module, and the cryptographic module, the at least one IC being enclosed by a package comprising a rigid enveloping layer to, if the package is opened, break the at least one IC chip.

18. The method according to claim 17 wherein the cryptographic module:
- receives the geographical coordinates signed with a global positioning system (GPS) cryptographic key of the positioning system module and the picture signed with a cryptographic key of the photo camera module;
- verifies the signatures of the geographical coordinates and picture;
- aggregates the geographical coordinates and the picture if the signatures are recognized and encrypts the aggregated data with a cryptographic key; and
- returns the encrypted aggregated data as the certified geographical position of the picture.

19. The method according to claim 17 wherein the at least one IC chip comprises a single integrated circuit (IC) chip; and wherein the cryptographic module includes a cryptographic key to sign the picture and the geographical coordinates.

20. The method according to claim 17 wherein at least one of the photo camera module, the positioning system module, and the cryptographic module is embedded in a first IC chip and the other modules are embedded in at least one second IC chip; and wherein each module performs mutual authentication with the other modules and transmits encrypted data to the other modules.

21. The method according to claim 17 further comprising: using a fingerprint detector to generate a fingerprint; and using the cryptographic module to sign the fingerprint.

22. The method according to claim 17 further comprising compressing the picture to be signed.

23. The method according to claim 17 further comprising: retrieving date/time when the picture is taken; and using the cryptographic module to sign the date/time.

* * * * *